United States Patent [19]
Grossmann et al.

[11] 3,931,102
[45] Jan. 6, 1976

[54] MOULDING COMPOSITION BASED ON POLY(OXYMETHYLENE)

[75] Inventors: Hans-Hermann Grossmann, Oberems, Taunus; Karlheinz Burg; Günter Sextro, both of Naurod, Taunus, all of Germany

[73] Assignee: Hoechst Aktiengesellschaft, Frankfurt am Main, Germany

[22] Filed: Oct. 4, 1974

[21] Appl. No.: 512,296

[30] Foreign Application Priority Data
Oct. 8, 1973  Germany............................ 2350415

[52] U.S. Cl.... 260/45.8 NT; 260/67 FP; 260/249.5; 260/249.9
[51] Int. Cl.² .... C08K 5/13; C08K 5/21; C08K 5/34
[58] Field of Search ................. 260/45.8 NT, 67 FP

[56] References Cited
UNITED STATES PATENTS

| | | | |
|---|---|---|---|
| 2,985,619 | 5/1961 | Roos et al. ......................... | 260/45.9 |
| 3,219,621 | 11/1965 | Prichard .......................... | 260/45.95 |
| 3,240,748 | 3/1966 | Schmidt et al. ..................... | 260/45.8 |
| 3,316,206 | 4/1967 | Hermann et al. .................... | 260/45.8 |
| 3,767,610 | 10/1973 | Burg et al. .......................... | 260/37 |

*Primary Examiner*—Donald E. Czaja
*Assistant Examiner*—R. A. White
*Attorney, Agent, or Firm*—Curtis, Morris & Safford

[57] ABSTRACT

A moulding composition based on poly(oxymethylene) containing a substituted ureido-s-triazine as nucleating and stabilizing agent is an excellent engineering plastic useful for preparing shaped articles having stable dimensions and an exact size.

1 Claim, No Drawings

MOULDING COMPOSITION BASED ON POLY(OXYMETHYLENE)

This invention relates to a moulding composition based on poly(oxymethylene) containing a substance which simultaneously acts as nucleating and stabilizing agent.

It is a known fact that oxymethylene-polymers - poly-(oxymethylene)POM — have a strong tendency to crystallize. Slight freezing of their melt suffices already to have the spherulites grow rapidly which are frequently larger than the wave length of light and which impart a considerable opacity to the material. Moreover, owing to the crystallization process in the interior and at the surface of the material numerous microscopically small fissures and internal tensions are formed. These fissures and internal tensions detrimentally affect the mechanical properties of shaped articles, for example injection moulded pieces, made of poly(oxymethylene). The aforesaid flaws are the more pronounced the larger the individual spherulites.

It is further known that by addition of talc to high-molecular poly(oxymethylenes) and uniform distribution of this inorganic additive in the organic material it is possible to unify the crystal structure of injection moulded pieces and thus to transform coarse-spherulite structures having an average spherulite diameter of 100 microns into homogeneous structures having spherulite diameters of from 4 to 8 microns (cf. German "Auslegeschrift" No. 1,247,645). Since there is the question of injection moulded test specimen, the afore mentioned sizes refer to preparations which had been crystallized under pressure at temperatures from 50° to 100° C.

It is further known that the spherulite size of poly(oxymethylenes) can be reduced by blending the poly(oxymethylenes) prior to melting with certain low-molecular organic nucleating agents which are slightly soluble or insoluble in the poly(oxymethylene) melt, e.g. derivatives of imidazole or pyrazine containing hydroxyl groups (cf. German "Offenlegungsschrift" No. 1,694,078).

However, the known nucleating agents have no stabilizing effect on poly(oxymethylenes) against thermal-acidolytical degradation.

On the other hand, a large number of organic compounds is known to have a stabilizing effect on poly(oxymethylenes), but do not show any nucleating effect. The most important factor for the stabilizing effect of these compounds is the prevention of the thermal-acidolytical degradation.

Known stabilizing agents for poly(oxymethylenes) are, for example, amides (cf. German Auslegeschrift No. 1,104,695), urea compounds (cf. German Auslegeschrift No. 1,185,371), amidines (cf. German Auslegeschrift No. 1,285,736), triazines (cf. German Offenlegungsschrift No. 1,494,997), hydrazines, aromatic amines and ureae (cf. German Auslegeschrift No. 1,127,080), cyclic ureides (cf. German Auslegeschrift No. 1,188,803), semicarbazones (cf. German Auslegeschriften Nos. 1,152,542 and 1,241,110) as well as oxalic acid diamides (cf. German Offenlegungsschrift No. 1,693,010). The aforesaid nitrogen-containing stabilizers are normally used in combination with phenolic antioxydation agents.

It is finally known that certain derivatives of 3,5-dialkyl-4-hydroxyphenyl-triazine are suitable stabilizing agents for organic materials, including also polyacetals, being prone to thermal and oxydative degradation (cf. German Offenlegungsschrift No. 2,219,012).

The present invention provides a moulding composition based on poly(oxymethylene) consisting of (a) from 99.9 to 95 weight percent of a poly(oxymethylene) and of (b) from 0.1 to 5 weight percent of a hydroxyphenyl-ureido-s-triazine. Especially suitable hydroxyphenyl-ureido-s-triazines are compounds having formula (I)

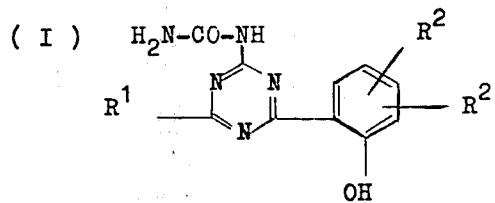

wherein $R^1$ representss a hydrogen atom, an alkyl radical or an alkoxy radical having each from 1 to 6, preferably 1,2,3 or 4 carbon atoms; a phenyl or phenoxy radical — each of which may be substituted by a hydroxyl group or an amino group which may carry one or two alkyl radicals having each from 1 to 6, preferably 1, 2, 3 or 4 carbon atoms — or an amino group which may carry one or two alkyl radicals each having from 1 to 6, preferably 1, 2, 3 or 4 carbon atoms; and $R^2$ represents a hydrogen atom, a hydroxyl group, an alkyl radical or alkoxy radical each having from 1 to 6, preferably 1, 2, 3 or 4 carbon atoms, or a phenyl radical.

The moulding composition according to the invention is preferably composed of (a) from 99.5 to 97 weight percent of a poly(oxymethylene) and (b) from 0.5 to 3 weight percent of a hydroxyphenyl-ureido-s-triazine.

As an example for the compounds of formula (I) being used as per the invention may be cited the following:

4-ureido-2-(2-hydroxyphenyl)-6-methyl-1,3,5-triazine,
4-ureido-2-(2-hydroxyphenyl)-6-tert.butyl-1,3,5-triazine,
4-ureido-2-(2-hydroxyphenyl)-6-phenyl-1,3,5-triazine,
4-ureido-2-(2,4-dihydroxyphenyl)-6-phenyl-1,3,5-triazine,
4-ureido-2-(2-hydroxy-4-methoxy-phenyl)-6-ethyl-1,3,5-triazine,
4-ureido-2-(2-hydroxy-5-methyl-phenyl)-6-phenyl-1,3,5-triazine,
4-ureido-2-(2-hydroxyphenyl)-6-(4-dimethylaminophenyl)-1,3,5-triazine,
4-ureido-2,6-bis(2-hydroxyphenyl)-1,3,5-triazine,
4-ureido-2-(2,4-dihydroxyphenyl)-6-(2-hydroxyphenyl)-1,3,5-triazine,
4-ureido-2,6-bis(2,4-dihydroxyphenyl)-1,3,5-triazine,
4-ureido-2-(2-hydroxy-4-methoxy-phenyl)-6-(2-hydroxyphenyl)-1,3,5-triazine,
4-ureido-2-(2-hydroxyphenyl)-6-phenoxy-1,3,5-triazine and
4-ureido-2-(2-hydroxyphenyl)-6-(3-methyl-phenoxy)-1,3,5-triazine.

The preparation of hydroxyphenyl-ureido-s-triazines is carried out in analogy to a known reaction of 4H-1,3- benzoxazine-4-ones with amidines, in the present case being guanyl-urea (cf. Helv.Chim.Acta, Vol.55, Fasc.5 (1972), No. 153, pg. 1566):

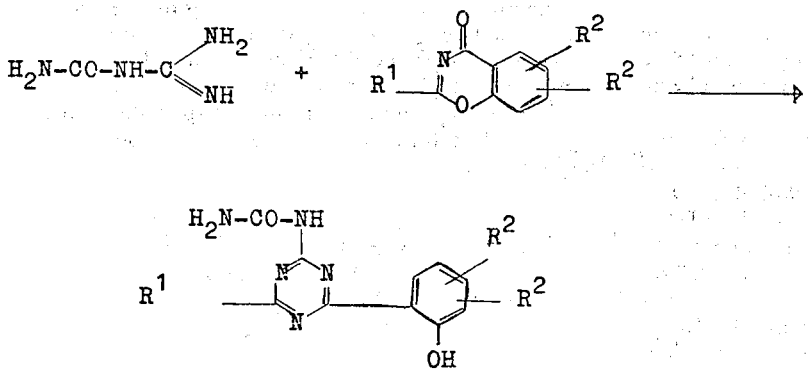

For example, 2,6-bis(2-hydroxyphenyl)-4-ureido-s-triazine

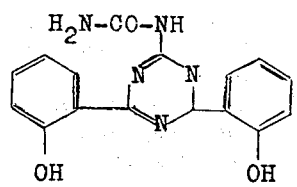

is synthesized as follows:

To a mixture of 12 g (50 millimoles) of 2-(2-hydroxyphenyl)-4H-1,3-benzoxazine-4-one and 7,5 g (55 millimoles) of guanyl-urea-sulfate with 250 ml of methanol is added dropwise, while stirring, a solution of 3.0 g (55 millimoles) of sodium methylate in 100 ml of methanol, and the mixture is then refluxed for one hour. After the mixture has been allowed to cool to room temperature, the precipitate formed is suction-filtered, washed once with one liter of water and three times with methanol and dried at 70° C in a vacuum drying cabinet. The yield obtained is 9.7 g (60,1 % of the theoretical yield). The substance obtained may be recrystallized from methyl glycol; up to 300° C it is not possible to determine a melting point, since the substance sublimates. The structure of the triazine derivative is confirmed by elementary analysis and NMR spectrum.

As poly(oxymethylenes) are used homopolymers of formaldehyde or trioxane or trioxane-copolymers; the poly(oxymethylenes) used as per the invention have, preferably, a linear structure.

By homopolymers of formaldehyde or trioxane are to be understood those the hydroxyl terminal groups of which are stabilized against degradation chemically, for example by esterification or etherification. By trioxane-copolymers are to be understood copolymers of trioxane and cyclic ethers, cyclic acetals and/or linear polyacetals the copolymers having primary alcohol terminal groups.

As comonomers for trioxane are to be considered (a) cyclic ethers having 3, 4, or 5, preferably 3 ring members, (b) cyclic acetals other than trioxane having from 5 to 11, preferably 5, 6, 7, or 8 ring members and (c) linear polyacetals, each in an amount of from 0.1 to 20, preferably from 0.5 to 10 weight percent. Most convenient are copolymers made of from 99 to 95 weight percent of trioxane and from 1 to 5 weight percent of one of the aforesaid co-components.

Especially appropriate comonomers for trioxane are compounds having formula (II)

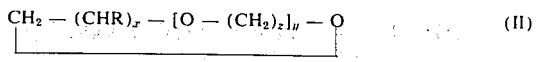

wherein R represents a hydrogen atom, an alkyl radical having from 1 to 6, preferably 1, 2 or 3 carbon atoms which may be substituted by 1, 2 or 3 halogen atoms, preferably by chlorine atoms, an alkoxymethyl radical having from 2 to 6, preferably 2, 3, or 4 carbon atoms, a phenyl radical or a phenoxymethyl radical; $x$ being 1, 2 or 3, $y$ then being zero; $y$ being 1, 2 or 3, $x$ then being zero and $z$ being 2; and $z$ being an integer from 3 to 6, preferably 3 or 4, $x$ then being zero and $y$ being 1.

Suitable cyclic ethers are especially epoxides, e.g. ethylene oxide, styrene oxide, propylene oxide and epichlorhydrin as well as phenyl glycidyl ether.

Suitable cyclic acetals are especially cyclic formals of aliphatic or cycloaliphatic $\alpha,\omega$-diols having from 2 to 8, preferably 2, 3 or 4 carbon atoms, the carbon chain of which may be interrupted by one oxygen atoms in intervals of 2 carbon atoms, e.g. glycol formal (1,3-dioxolane), propanediol formal (1,3-dioxane), butanediol formal (1,3-dioxepane) and diglycol formal (1,3,6-trioxocane) as well as 4-chloromethyl-1,3-dioxolane, hexanediol formal (1,3-dioxonane) and butenediol formal (1,3-dioxacycloheptene-(5)).

Suitable linear polyacetals are as well homopolymers or copolymers of the aforedefined cyclic acetals as also linear condensation products from aliphatic or cycloaliphatic $\alpha,\omega$-diols with aliphatic aldehydes or thioaldehydes, preferably formaldehyde. Most frequently are used homopolymers of cyclic formals from aliphatic $\alpha,\omega$-diols having from 2 to 8, preferably 2,3 or 4 carbon atoms, e.g. poly(1,3-dioxolane), poly(1,3-dioxane) and poly(1,3-dioxepane).

The values for the reduced specific viscosity (RSV-values) of poly(oxymethylenes) used according to the invention (measured on a solution of the polymer in butyrolactone containing 2 weight percent of diphenylamine, at 140° C in a concentration of 0.5 g/100 ml) are from 0.07 to 2.50 dl.g$^{-1}$, preferably from 0.14 to 1.20 dl.g$^{-1}$. The crystallite melting points of the poly(oxymethylenes) keep within the range from 140° to 180° C, preferably from 150° to 170° C, their densities are from 1.38 to 1.45 g.ml$^{-1}$, preferably from 1.40 to 1.43 g.ml$^{-1}$ (measured as per German Industrial Standard DIN 53 479).

The trioxane-copolymers used according to the invention and being preferably binary or ternary are prepared in known manner by polymerization of the monomers in the presence of cationically active catalysts at temperatures from 0° to 100°C, preferably from 50° to 90° C (cf. e.g. German Auslegeschrift No. 1,420,283). Suitable catalysts used for that purpose are, for example, Lewis acids, e.g. boron trifluoride and antimony pentafluoride, and complex compounds of Lewis acids, preferably etherates, e.g. boron trifluoride-diethyl-etherate and boron trifluoride-di-tert.-butyletherate. Furthermore are suitable: protonic acids, e.g. perchlorid acid, as well as saline compounds, e.g. triphenylmethyl hexafluorophosphate, triethyloxonium tetrafluoroborate or acetyl perchlorate. The polymerization can be carried out in bulk, in suspension or in solution. For eliminating instable portions it is useful to submit the copolymers to a thermal or hydrolytical controlled partial degradation down to primary alcohol terminal groups (cf. German Auslegeschriften Nos. 1,445,273 and 1,445,294).

The homopolymers of formaldehyde or of trioxane — used as per the invention — are also prepared in known manner by catalytical polymerization of the monomer (cf. e.g. German Auslegeschrift No. 1,037,705 and German Pat. No. 1,137,215).

The most useful method for preparing the moulding composition according to the invention is to mix the components being present each as powder or granule and to homogenize subsequently. The nucleating agents are used preferably as powders fine as dust having a particle size inferior to 5, preferably inferior to 3 microns. Usually, mixing is carried out at room temperature, preferably at a temperature of from 15° to 30° C, homogenization is performed in any heatable mixing device, e.g. drums, calenders, kneaders or extruders, at a temperature above the crystallite melting point of the poly(oxymethylene), i.e. at a temperature from 150° to 250° C, preferably from 170° to 220° C.

Evidently, the presence of hydroxyphenyl-ureido-s-triazines used as per the invention entails nucleation upon preparing shaped articles which nucleation reduces the size of the spherulites and improves the mechanical properties of the shaped articles, for example increased ball indentation hardness, stretching strain, tensile strength and torsional stiffness — compared to these properties observed on a non-modified linear poly(oxymethylene). Another effect of the nucleation is an increased crystallization speed which enables an increased processing speed, a fact showing especially in shorter cycle periods for injection moulding and in reduced tolerance ranges for injection moulded pieces.

The use as per the invention of hydroxyphenyl-ureido-s-triazines offers the special advantage that these compounds not only have a nucleating effect but also good stabilizing action as well against thermal-acidolytical as against thermal-oxydative degradation of poly(oxymethylenes), too. Contrary to the stabilizing or nucleating agents hitherto known which had either a stabilizing, but no nucleating effect or — on the other hand — a nucleating effect without any stabilizing action, the compounds of the invention are as well efficient nucleating agents as stabilizers against heat, acid and oxygen action.

The moulding composition according to the invention can be crushed mechanically, for example, by chopping or grinding, to yield granules, chips, flakes or powder. It is well suitable for being worked-up in the thermoplastic state, e.g. by injection moulding or extrusion, especially for preparing shaped articles being used e.g. as bars, rods, plates, films, ribbons, jars and tubes; it is most suitable as engineering plastic for the preparation of machinery parts having stable dimensions and an exact size, such as gear wheels, bearing parts and control elements.

The following examples illustrate the invention:

EXAMPLES

A linear copolymer made of 98 weight percent of trioxane and 2 weight percent of ethylene oxide (having a density of 1.41 g.ml$^{-1}$, a RSV-value of 0.73 dl.g$^{-1}$ and a crystallite melting point of 166° C) is blended as a powder with the quantities of nucleating agent indicated in the following table, calculated on the quantity of poly(oxymethylene), and homogenized at 200° C in a single screw extruder. The residence time in the cylinder of the extruder is about 4 minutes. The poly(oxymethylene) mass obtained in each case is granulated upon emerging from the extruder.

A film is prepared from the moulding composition obtained and the size of the spherulites determined; the film is prepared by melting the moulding composition at 180° C between two glass plates under a pressure of 200 kg.cm$^{-2}$ and subsequent crystallization at 150° C under atmospherical pressure to yield a film 10 microns thick for microscopical examination. Moreover, plates having the dimensions 60 × 60 × 2 mm are prepared at a mass temperature of 200° C and a mould temperature of 80° C by injection moulding from the moulding composition obtained which plates are then used for determining the ball indentation hardness according to VDE regulation 0302 (loading time 10 seconds). Furthermore, the weight loss of the granulated moulding composition is determined by exposing the granule for 2 hours to a temperature of 230°C under air. The following table shows the spherulite size, ball indentation hardness and weight loss of shaped articles made of the moulding composition according to the invention. For comparison, the corresponding data of poly(oxymethylenes) without addition of an additive or containing a known stabilizer or nucleating agent or both only (cf. examples A to E) are also compiled.

Table

| Example | Additive (Weight) % | | Spherulitesize (Micron) | ball indentation hardness(kg/cm$^2$) | Weight loss (%/2h) |
| --- | --- | --- | --- | --- | --- |
| A | — | | 550 | 1550 | >50 |
| B | 2,3-Dioxy-chinoxaline | 1 | <5 | 1640 | >50 |
| C | Melamine | 1 | 350 | 1550 | 12 |
| D | 2,2'-Methylene-bis(4-methyl-6-tert.butyl-phenol) | 1 | 550 | 1555 | >50 |
| E | Melamine | 0.5 | | | |
|   | 2,2'-Methylene-bis(4-methyl-6-tert.butyl-phenol) | 0.5 | 400 | 1555 | 2.2 |
| 1 | 2,6-Bis(2-hydroxyphenyl)-4-ureido-s-triazine | 0.5 | 40 | 1580 | 4.3 |
| 2 | 4-ureido-s-triazine | 1 | 17 | 1610 | 2.3 |
| 3 | 4-ureido-s-triazine | 3 | 5 | 1630 | 2.2 |
| 4 | 2-(2-Hydroxyphenyl)-6-methyl-4-ureido-s-triazine | 1 | 25 | 1600 | 2.5 |

What is claimed is:

1. Moulding composition based on poly(oxymethylene), consisting of (a) from 99.9 to 95 weight percent of a poly(oxymethylene) and
   (b) from 0.1 to 5 weight percent of a hydroxyphenyl-ureido-s-triazine having the formula

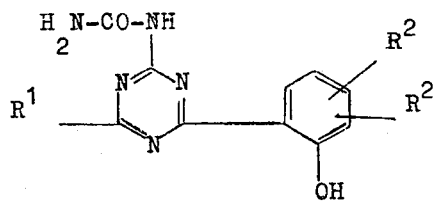

in which $R^1$ represents a hydrogen atom, an alkyl radical or an alkoxy radical each having from 1 to 6 carbon atoms, a phenyl or a phenoxy radical -- each of which may be substituted by a hydroxyl group or an amino group being able to carry one or two alkyl radicals having from 1 to 6 carbon atoms each -- or an amino group which may carry one or two alkyl radicals having each from 1 to 6 carbon atoms; and $R^2$ represents a hydrogen atom, a hydroxyl group, an alkyl radical or alkoxy radical each having from 1 to 6 carbon atoms or a phenyl radical.

* * * * *